(12) United States Patent
Voss

(10) Patent No.: US 10,604,237 B2
(45) Date of Patent: Mar. 31, 2020

(54) AIRCRAFT WITH A WEIGHT ELEMENT CONTROLLING THE CENTER OF GRAVITY THEREOF

(76) Inventor: Andreas Voss, Seevetal OT Holtorfsloh (DE)

( * ) Notice: Subject to any disclaimer, the term of this patent is extended or adjusted under 35 U.S.C. 154(b) by 1883 days.

(21) Appl. No.: 13/984,688

(22) PCT Filed: Feb. 8, 2012

(86) PCT No.: PCT/DE2012/100026
§ 371 (c)(1),
(2), (4) Date: Nov. 21, 2013

(87) PCT Pub. No.: WO2012/107034
PCT Pub. Date: Aug. 16, 2012

(65) Prior Publication Data
US 2019/0193839 A1    Jun. 27, 2019

(30) Foreign Application Priority Data

Feb. 11, 2011    (DE) .................. 10 2011 000 651

(51) Int. Cl.
*B64C 17/04*    (2006.01)
*B64C 39/06*    (2006.01)
(Continued)

(52) U.S. Cl.
CPC .............. *B64C 17/04* (2013.01); *B64C 3/30* (2013.01); *B64C 11/001* (2013.01); *B64C 15/00* (2013.01); *B64C 39/024* (2013.01); *B64C 39/028* (2013.01); *B64C 39/066* (2013.01); *B64C 39/068* (2013.01); *B64C 39/10* (2013.01); *B64C 2201/028* (2013.01); *B64C 2201/104* (2013.01);
(Continued)

(58) Field of Classification Search
CPC ......... B64C 17/02; B64C 17/04; B64C 39/06; B64C 39/062; B64C 39/066; B64C 39/068; B64C 39/08
See application file for complete search history.

(56) References Cited

U.S. PATENT DOCUMENTS 1,853,233 A     4/1932  Schwarz
1,939,682 A  *  12/1933  Fleming ................ B64C 39/068
                                                        244/45 R
(Continued)

FOREIGN PATENT DOCUMENTS

DE    8714893    1/1988
DE    29502677   5/1995
(Continued)

*Primary Examiner* — Joseph W Sanderson
(74) *Attorney, Agent, or Firm* — Welsh Flaxman & Gitler LLC

(57) ABSTRACT

The invention pertains to a remote-controlled miniature aircraft with at least one lift surface (17), with at least one pair of propeller drives (12, 13) and with a weight element (20), the position of which can be varied in the longitudinal direction of the miniature aircraft (10) in order to change the center of gravity of the miniature aircraft (10). In order to realize a more compact construction with improved flying characteristics, the lift surface (17) of the miniature aircraft (10) is arranged above a plane defined by the rotational axes of the propeller drives (12, 13) in order to generate a lifting force for taking off and/or landing from a standstill.

13 Claims, 2 Drawing Sheets

(51) Int. Cl.
  *B64C 15/00* (2006.01)
  *B64C 39/10* (2006.01)
  *B64C 39/02* (2006.01)
  *B64C 3/30* (2006.01)
  *B64C 11/00* (2006.01)
(52) U.S. Cl.
  CPC .. *B64C 2201/162* (2013.01); *B64C 2201/165* (2013.01)

(56) References Cited

U.S. PATENT DOCUMENTS

| | | | | |
|---|---|---|---|---|
| 1,943,774 | A | | 1/1934 | Shaw |
| 2,275,094 | A | * | 3/1942 | Taylor .................. A63H 27/005 446/66 |
| 2,879,957 | A | * | 3/1959 | Lippisch ............. B64C 29/0025 244/23 R |
| 2,910,254 | A | * | 10/1959 | Razak .................... B64C 23/00 244/208 |
| 3,017,139 | A | * | 1/1962 | Binder ................. B64C 39/062 244/12.6 |
| 4,345,401 | A | * | 8/1982 | Brzack ................... A63H 27/00 244/13 |
| 5,332,177 | A | * | 7/1994 | Boyle, Jr. ............. B64C 39/062 244/34 A |
| 6,685,137 | B2 | * | 2/2004 | Darbyshire ............. B64C 17/02 244/80 |
| 7,100,867 | B2 | * | 9/2006 | Houck, II ............... B63B 1/248 244/130 |
| 7,770,839 | B2 | * | 8/2010 | Iwata ..................... B64C 17/04 244/38 |
| 7,988,088 | B2 | * | 8/2011 | Konstantinovskiy ..... B64C 3/54 244/12.6 |
| 8,246,414 | B2 | * | 8/2012 | Suzuki ................... A63H 30/04 446/454 |
| 8,262,016 | B2 | * | 9/2012 | Gosling ................ B64C 39/024 244/12.2 |
| 8,602,348 | B2 | * | 12/2013 | Bryant ................ B64C 29/0033 244/12.4 |
| 8,752,788 | B2 | * | 6/2014 | Tuval ........................ B64C 3/32 244/34 A |
| 9,308,984 | B2 | * | 4/2016 | Suokas .................... B64C 1/26 |
| 2003/0129917 | A1 | * | 7/2003 | Lou ........................ A63H 27/00 446/61 |
| 2005/0173592 | A1 | | 8/2005 | Houck, II |
| 2007/0012818 | A1 | | 1/2007 | Miyazawa et al. |
| 2010/0044496 | A1 | * | 2/2010 | Gosling ................ B64C 39/024 244/12.5 |
| 2010/0051755 | A1 | | 3/2010 | Nichols et al. |
| 2010/0330866 | A1 | * | 12/2010 | Suzuki ................... A63H 27/02 446/57 |
| 2011/0001001 | A1 | * | 1/2011 | Bryant ................ B64C 29/0033 244/12.5 |
| 2011/0108675 | A1 | * | 5/2011 | Tuval ........................ B64C 3/32 244/45 R |

FOREIGN PATENT DOCUMENTS

| | | | | |
|---|---|---|---|---|
| FR | | 3049575 A1 | * 10/2017 | ........... B64C 39/062 |
| WO | WO2008/007147 | | 1/2008 | |
| WO | WO2009/069109 | | 6/2009 | |
| WO | WO2009/095696 | | 8/2009 | |

* cited by examiner

AIRCRAFT WITH A WEIGHT ELEMENT CONTROLLING THE CENTER OF GRAVITY THEREOF

BACKGROUND OF THE INVENTION

The invention pertains to an aircraft, particularly a remote-controlled miniature aircraft, with at least one lift surface, with at least one pair of propeller drives and with a weight element, the position of which can be varied in the longitudinal direction of the aircraft in order to change the center of gravity of the aircraft.

An aircraft of this general type was disclosed in WO 2008/007147 A1. In this case, a pendulum arranged underneath the aircraft is used as weight element. A hovering state of the aircraft can be achieved if the pendulum is suitably positioned. This aircraft is furthermore equipped with a wing unit, a tail unit and respectively separate control surfaces.

In this case using a pendulum, it is disadvantageous that such an aircraft or miniature aircraft can only be safely operated after an extended training period. In addition, such an aircraft is relatively bulky-due to a tail boom for the tail unit and/or the pendulum-like arrangement of the weight element. This arrangement complicates the transport of the aircraft. Furthermore, the aircraft may be easily damaged during its transport and/or an unfavorable flight maneuver.

This significantly limits the potential applications of an aircraft, for example, as a reconnaissance drone.

The invention therefore is based on the objective of enhancing an aircraft, particularly a remote-controlled miniature aircraft, in such a way that a more compact and more robust construction with improved flying characteristics is realized.

SUMMARY OF THE INVENTION

In the inventive remote-controlled miniature aircraft, it is particularly advantageous that the lift surface is arranged above a plane defined by the rotational axis of the at least one pair of propeller drives in order to generate a lifting force for taking off and/or landing from a standstill.

This makes it possible to realize a very compact construction. In addition, the proposed arrangement of the upper lift surface relative to the at least one pair of propeller drives already results in a high lifting force at a standstill and therefore promotes a very slow take-off and/or landing speed, particularly due to the Custer effect. The aircraft is particularly suitable as a vertical take-off and/or landing aircraft. In this context, the term propeller is also representative of air screws, rotors or other types of aerodynamic motors.

The lift surface is an upper lift surface that is arranged above a lower lift surface, wherein the upper lift surface and the lower lift surface are integrated into a single closed wing in order to realize an aircraft without fuselage. In this "closed wing" concept, the upper lift surface and the lower lift surface are rigidly connected to one another and spaced apart from one another by means of lateral surfaces on two lift surface ends that face away from one another, particularly over the entire chord of the upper lift surface and/or lower lift surface. A fuselage of the type used in conventional aircraft is not required. This promotes stable and therefore improved flying characteristics. The aircraft therefore is easier to control. A person can be trained in the operation, of such a remote-controlled miniature aircraft in an accelerated fashion. Furthermore, a more compact and more robust construction is realized due to the closed wing.

The aircraft has a low weight, in particular a weight of less than 1 kg. Furthermore, the aircraft is essentially formed by the wing. This reduces the risk of damages to the aircraft, particularly in the form of an unmanned and remotely controlled miniature aircraft, during its transport and/or an unfavorable flight maneuver. The aircraft is constructed in the form of a flying wing. In a construction in the form of a flying wing or quasi-flying wing, projecting components such as a tail boom are largely avoided and the risk of damage during transport or in flight is additionally reduced. The upper lift surface and the lower lift surface may be arranged on top of one another such that they completely overlap and thereby an even more compact construction is achieved. The aircraft particularly stabilizes itself in flight and/or a stall is largely prevented.

According to another embodiment, the closed wing is in the form of a ring wing or a box wing. The ring wing is in the form of a vertical ring wing such that a tubular body, which is open toward the front and the rear in the intended direction of flight, or an open ring, results. Ring wings or box wings are known wing concepts that promote a robust construction and/or stable flying characteristics. Furthermore, wing constructions of this type have excellent lift characteristics such that slow take-off speeds can be realized. The lift surfaces and/or the wing may consist of a film material that can be cost-efficiently manufactured and easily transported. When utilizing film material, it can be simply rolled up for its transport. In this case, the installation is realized by simply unrolling and attaching the film material to a frame structure. It would also be conceivable to utilize carbon fiber materials or other suitable composite fiber materials as an alternative to, or in addition to, a film material. This promotes a highly stable and lightweight construction.

According to an enhancement, the upper lift surface, the lower lift surface and/or the closed wing are constructed rigid, film-like or inflatable. A rigid construction of the lift surfaces and/or the closed wing provides the advantage of a particularly stable and robust construction. In an alternative embodiment, the lift surfaces and/or the entire closed wing could be inflatable such that the aircraft can be packaged in a particularly space-saving fashion for its transport. For a sortie, the lift surfaces and/or the closed wing may be constructed such that they are self-inflatable by means of a flowing air current, for example, like a paraglider or composed of chambers or tanks that can be inflated and closed. The chambers or tanks may be filled with air or with an operating medium for supplying a drive and/or a power supply unit for the aircraft. The chambers or tanks may contain hydrogen for operating a fuel cell assigned to the aircraft.

The propellers of the pair of propeller drives are preferably arranged in front of or behind the two lift surfaces, referring to the longitudinal direction of the aircraft, in order to generate an air flow over the upper lift surface and/or the lower lift surface. Consequently, two propellers of two propeller drives are positioned in front of or behind the one or more lift surfaces and/or the closed wing in the intended direction of flight. It is preferred to provide two or more pairs of propeller drives. One or more pairs of propeller drives are preferably arranged coaxially. During the operation, the rotating propellers already conduct and/or suck air over both lift surfaces of the wing with high speed at a standstill or at a very slow flying speed of the aircraft. This makes it possible to realize a particularly slow take-off speed. In an arrangement of an upper lift surface that is arranged above a lower lift surface, a surface area that is approximately twice as large as that of a construction with only a single lift surface can be utilized for generating lift. The miniature aircraft can take off from the hand of a person. The aircraft is in the form of a vertical take-off and/or landing aircraft, i.e., it is VTOL-compatible (VTOL: vertical take-off and landing).

The pair of propeller drives is preferably arranged between the upper lift surface and the lower lift surface. This reduces the risk of damage to the propeller drives because the propeller drives are at least partially surrounded or shrouded by the two lift surfaces and/or the closed wing. In such an arrangement of the propeller drives, it is furthermore possible to have small propeller diameters in order to generate a simultaneous air flow over the upper and the lower lift surface.

In addition, the upper lift surface and/or the lower lift surface is/are arranged between the rotational axis of the propeller drives and the maximum wingspan of the propellers. This ensures that air is conducted over the upper side of the lower lift surface and/or the upper lift surface with high speed by means of the propellers during the operation of the aircraft. This promotes a slow take-off speed and, in particular, a VTOL-compatible design of the aircraft.

The propellers of the propeller drives are at least partially shrouded by at least one propeller guard in the region of the propeller circumference. This reduces the risk of damage to the propellers during the transport of the aircraft and/or in flight. The propellers of several propeller drives may be shrouded by a propeller guard separately and be in the form of shrouded propellers or the propellers are jointly shrouded by a single propeller guard. If a separate propeller guard is provided for each propeller, the individual propeller guard elements may be connected to one another by means of braces.

In addition, the propeller guard may be rigidly connected to one or more lift surfaces or the closed wing, particularly by means of braces, such that an altogether robust and compact construction is achieved. The construction of the aircraft is constructed in a semi-rigid fashion. This significantly reduces the risk of resonance effects. The closed wing lies within the circumference of the propeller guard. The maximum height and width of the aircraft are defined by the height and width of the propeller guard.

The static thrust of the shrouded propellers is greater than the static thrust of non-shrouded propellers such that a slower take-off speed is additionally promoted. The propeller guard may have a cylindrical or tubular cross section or a cross section that is similar or identical to the closed wing shape or lift surface. The wing has a smaller height than the propeller guard and is offset downward relative to a center line of the propeller guard. This promotes an excellent air flow over the upper side of the upper lift surface and/or lower lift surface.

According to an enhancement, a weight element is centrally arranged on the lift surface, particularly between the propeller drives. The weight element makes it possible to trim the aircraft about its lateral axis in order to compensate different load distributions. The weight element serves for stabilizing the aircraft against external influences and/or negative aerodynamic effects. The weight element can furthermore be used for controlling the aircraft about its lateral axis such that the flying height can be adjusted. A weight element that can be variably positioned makes it possible to eliminate a tail boom for a tail unit such as an elevator unit and/or rudder unit.

The weight element may be constructed such that it can be linearly displaced in the longitudinal direction of the aircraft along its center line by means of a shifting mechanism or pivoted about a lateral axis of the aircraft by means of a pivoting mechanism such as a servomotor or an ultrasonic motor. The weight element is connected to the lift surface and/or the closed wing underneath the upper lift surface such that it can be pivoted about a lateral axis. In this way, the weight element and the pivoting mechanism are at least partially protected from external influences by the upper lift surface and/or the lower lift surface or by the closed wing, respectively. The weight element may be designed for accommodating equipment elements such as a control, sensors, energy cells, payloads, etc.

According to another embodiment, a control is provided for controlling the aircraft, particularly by means of a remote control, wherein the flight attitude in a longitudinal axis and/or a vertical axis of the aircraft can be adjusted by means of a difference between the propulsive forces, between the rotational speeds or chord incidences of the propeller drives. The flight attitude in the lateral axis may furthermore be adjustable by a displacement of the weight element. Consequently, a change of the flight attitude about a longitudinal axis, a vertical axis and/or a lateral axis of the aircraft can be realized without control surfaces. This reduces the risk of damages to the aircraft during its transport and/or in flight. The flight attitude of the aircraft is merely controlled by means of the rotational speed of the propeller drives, and by means of the weight distribution in the longitudinal direction of the aircraft.

In order to realize the control of the aircraft by means of the rotational speed, it is necessary to provide at least one or more pairs of propeller drives. In this case, the propeller drives of a pair of propeller drives are shifted from the center of the aircraft such that they face away from one another. For example, if the rotational speed of a first propeller drive is reduced, the propulsive force generated by this propeller drive is also reduced. If the rotational speed of a second propeller drive is simultaneously maintained at the original level of the first propeller drive or increased, the propulsive force of the second propeller drive is higher than the propulsive force of the first propeller drive. This causes the aircraft to turn about its vertical axis in the direction of the first propeller drive. If the aircraft should turn about the vertical axis in the direction of the second propeller drive, the rotational speed of the second propeller drive is reduced relative to the rotational speed of the first propeller drive.

Control means and/or energy supply means are integrated and/or imprinted into the lift surface and/or into the closed wing. For example, at least one antenna may be provided as control means. Furthermore, a solar element may be additionally or alternatively provided as energy supply means. An antenna may also serve as energy supply means, wherein energy is transmitted by means of microwaves in this case. The energy supply means make it possible to charge accumulators of the aircraft. The control means and/or the energy supply means is preferably realized in the form of a transponder, particularly a RFID (radio-frequency identification) that preferably features a backward channel.

According to an alternative embodiment, the energy supply means is realized in the form of an energy collection panel for a laser beam. Consequently, it is possible to remotely charge accumulators of the aircraft by means of a laser beam. It is preferred to provide several energy collection panels that are arranged adjacent to one another. This makes it possible to have a self-adjusting guidance of the laser beam such that the charging process is simplified. If several energy collection panels are arranged adjacent to one another, it is furthermore possible to provide an automatic distance control. The greater the distance from the aircraft, the wider the laser beam and the more adjacently arranged energy collection panels are irradiated. The laser beam becomes more focused and narrower as the distance from the aircraft decreases. This results in the laser beam being incident on fewer energy collection panels. This effect can be utilized for a distance control.

The inventive aircraft is particularly suitable for use as a remote-controlled reconnaissance drone, wherein monitoring means are arranged on the reconnaissance drone. For example, monitoring means in the form of imaging sensors may be arranged on the weight element, a leading edge of the lift surface and/or the closed wing and/or a leading edge of the propeller guard. Due to its compact and lightweight design, the aircraft can be comfortably transported by one person in a backpack. Furthermore, the flying characteristics are so stable that the drones can be controlled by one person after a shorter training period than that of conventional aircraft models. The slow take-off speed is particularly advantageous with respect to the flying characteristics. This makes it possible to start the aircraft from the hand of a person such that the aircraft is also ready to take off at all times in rough terrain. A special catching device therefore is not required for the landing.

BRIEF DESCRIPTION OF THE DRAWINGS

The invention is described in greater detail below with reference to exemplary embodiments that are illustrated in the figures. In addition, enhancements, advantages and potential applications of the invention also result from the following description of an exemplary embodiment and from the figures. In this respect, all described and/or graphically illustrated characteristics basically form the object of the invention individually or in arbitrary combination regardless of their summarization in the claims or their references to other claims. The content of the claims also forms part of the description.

However, it is expressly noted that the invention is by no means limited to the described examples.

IN THE FIGURES

Figure 1:
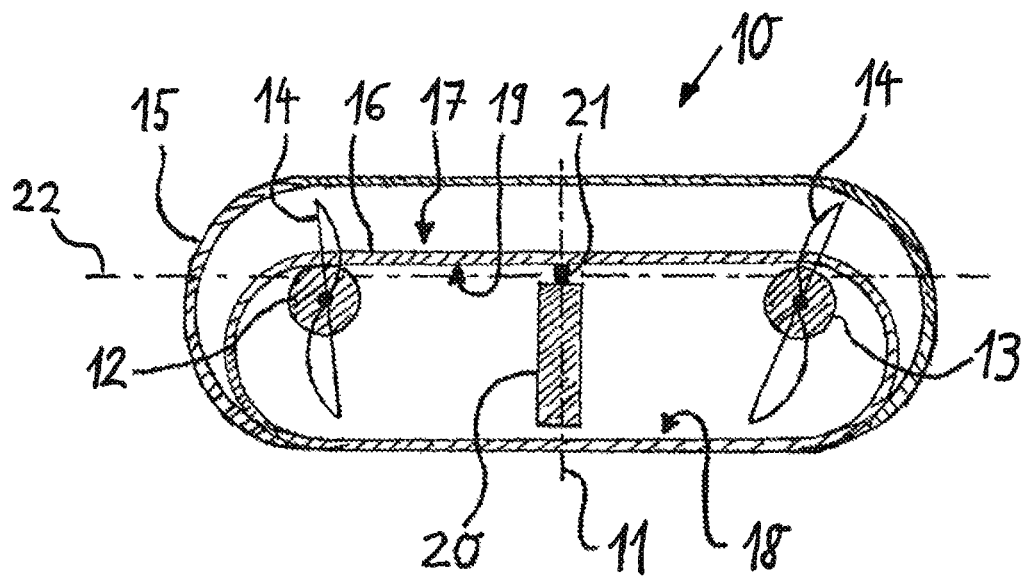
Figure 2:
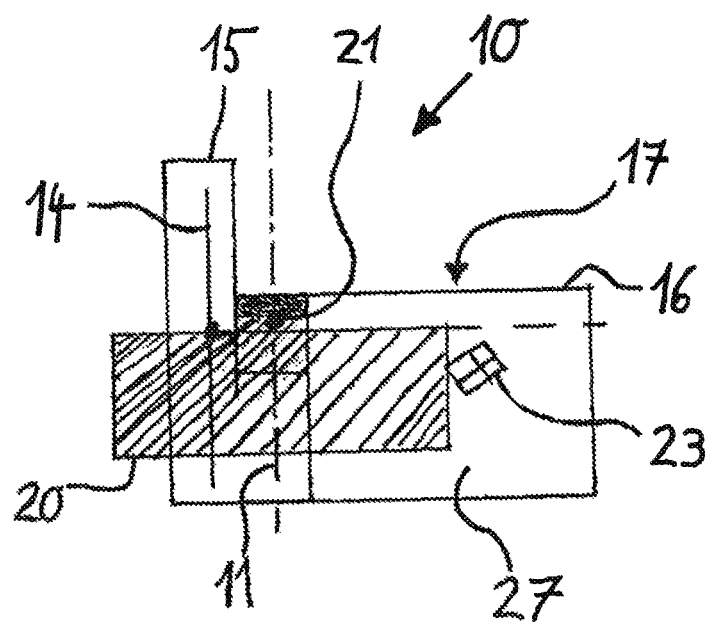
Figure 3:
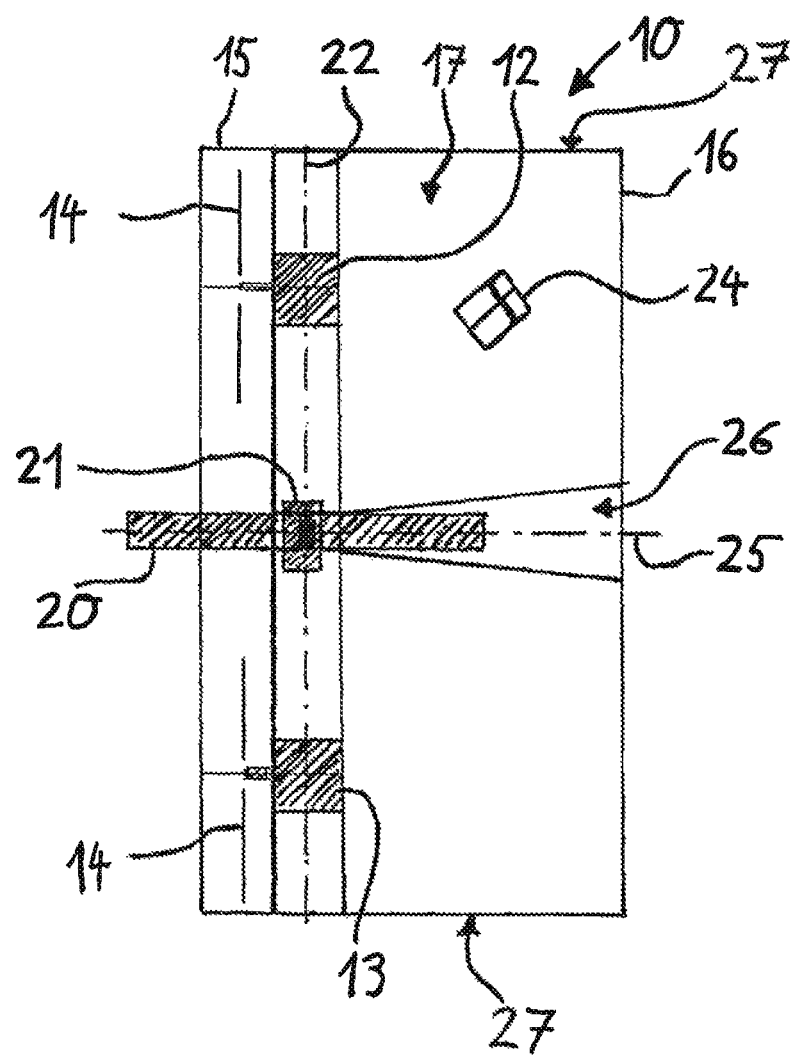

FIG. 1 shows a schematic front view of an inventive aircraft,

FIG. 2 shows a partially sectioned schematic side view of the inventive aircraft according to FIG. 1, and FIG. 3 shows a partially sectioned schematic top view of the inventive aircraft according to FIGS. 1 and 2.

DETAILED DESCRIPTION OF THE INVENTION

FIG. 1 shows a schematic front view of an inventive aircraft or miniature aircraft 10. The aircraft 10 is constructed axially symmetrical about a vertical axis 11 and provided with two propeller drives 12, 13 that respectively each feature a propeller 14. In the exemplary embodiment shown, the propellers 14 are surrounded by a propeller guard 15 in the region of the outer circumference of the propellers 14. A single propeller guard 15 is provided for the propellers 14 of both propeller drives 12, 13 in this case. Alternatively, it would also be conceivable to provide separate propeller guard elements for the propellers 14 of the propeller drives 12, 13, wherein these propeller guard elements may be connected to one another in order to stabilize the construction.

A closed wing 16 is arranged behind the propeller guard 15 in the front view according to FIG. 1 or referred to the intended direction of flight of the aircraft 10, respectively. In the exemplary embodiment shown, the closed wing 16 is realized in the form of a ring wing 16. The aircraft 10 is constructed without an additional fuselage. The closed wing 16 features an upper lift surface 17 that is arranged above a lower lift surface 18. The height of the closed wing 16 is smaller than the height of the propeller guard 15. In the exemplary embodiment shown, the height of the wing 16 is approximately ⅓ smaller than the height of the propeller guard 15. In addition, the closed wing 16 is offset downward relative to the propeller guard 15 in comparison with a central, symmetrical arrangement. However, the closed wing 16 does not protrude over the circumference of the propeller guard 15 in this case, but rather remains within this circumference.

The propeller drives 12, 13 are mounted on an underside 19 of the upper lift surface 17 at a distance from one another and axially symmetrical to the central vertical axis 11. Furthermore, a weight element 20 is centrally arranged on the underside 19. In the exemplary embodiment shown, the weight element 20 is mounted on the underside 19 by means of a pivot joint 21. In this case, the pivot joint 21 makes it possible to pivot the weight element 20 about a lateral axis 22.

FIG. 2 shows a partially sectioned schematic side view of the inventive aircraft 10 according to FIG. 1. In the exemplary embodiment shown, the weight element 20 protrudes forward beyond the propeller guard 15 in the intended direction of flight in this exemplary embodiment. A lateral surface 27 is respectively arranged on the lift surface ends that face away from one another and extends over the entire chord of the upper and lower lift surfaces 17, 18.

A schematically illustrated control means 23 is arranged in an exemplary fashion on the lateral surface 27 of the propeller guard 15. In this case, the control means 23 is realized in the form of an antenna 23 that is integrated into the propeller guard 15 and serves for receiving control signals for remotely controlling the unmanned aircraft 10.

FIG. 3 shows a partially sectioned schematic top view of the inventive aircraft 10 according to FIGS. 1 and 2. A schematically illustrated energy supply means 24 is arranged in an exemplary fashion on the upper lift surface 17. In the exemplary embodiment shown, the energy supply means 24 is realized in this form of a solar module 24.

The aircraft 10 is axially symmetrical to a longitudinal axis 25. Furthermore, the upper lift surface 17 features a section 26 that is realized axially symmetrical to the longitudinal axis 25. The section 26 is essentially realized in a V-shaped fashion and tapered in the direction of the weight element 20. The smallest width of the section 26 corresponds to the width of the weight element 20 in order to enable the weight element 20 to protrude beyond the upper lift surface 17 when the weight element 20 is pivoted about the lateral axis 22. In the exemplary embodiment shown, the lower lift surface 18 also features a not-shown section 26 in order to enable the weight element 20 to protrude beyond the lower lift surface 18 when the weight element 20 is pivoted about the lateral axis 22.

The function of the aircraft 10 is elucidated below with reference to FIGS. 1 to 3:

For example, if the unmanned aircraft 10 should be utilized as a reconnaissance drone, the aircraft is equipped with suitable monitoring means. These monitoring means may form integral components of the weight element 20. The energy required for the operation of the monitoring means, as well as for the control of the aircraft 10, is supplied by accumulators and/or one or more energy supply means 24.

The aircraft 10 has such dimensions and such a weight that the miniature aircraft 10 can be transported by a single person, for example, in a backpack. The aircraft 10 is controlled by means of a remote control that can be operated by one person. The signals of the remote control are detected by the control means 23 and forwarded.

In this case, the control is realized in such a way that the aircraft 10 is pivoted about the longitudinal axis 25 and/or the vertical axis 11 by operating the propeller drives 12, 13 with different rotational speeds. Due to the different rotational speeds of the propeller drives 12, 13, these propeller drives generate a different propulsive force such that the aircraft 10 is turned about its longitudinal axis 25 and/or its vertical axis 11. The direction of flight of the aircraft 10 can be controlled in this fashion.

The weight element 20 is pivoted about the lateral axis 22 of the aircraft 10 in order to control the flying height of the aircraft 10. This causes the center of gravity of the aircraft 10 to shift and the aircraft 10 assumes an ascending position or a descending position in dependence on the pivoting direction.

Consequently, no control surfaces are required for the control of the aircraft 10 such that the aircraft 10 is particularly robust and a high ground readiness is promoted. Furthermore, it is not required to provide a tail boom such that a compact construction is ensured.

The propellers 14 that are arranged in front of or, according to an alternative embodiment, behind the lift surfaces 17, 18 and the propellers 14 already conduct air over the lift surfaces 17, 18 with high speed at a standstill. This results in a very slow take-off speed such that the aircraft 10 is able to take off from and land in the hand of a person.

LIST OF REFERENCE SYMBOLS

10 Aircraft or miniature aircraft
11 Vertical axis
12 Propeller drive
13 Propeller drive
14 Propeller
15 Propeller guard
16 Wing
17 Upper lift surface
18 Lower lift surface
19 Underside
20 Weight element
21 Pivot joint
22 Lateral axis
23 Control means
24 Energy supply means
25 Longitudinal axis
26 Section
27 Lateral surface

The invention claimed is:

1. An aircraft comprising:
an upper lift surface and a lower lift surface,
at least one pair of propeller drives, and
a weight element, a position of the weight element can be displaced in a longitudinal direction of the aircraft in order to change a center of gravity of the aircraft, wherein the upper lift surface is arranged between a plane comprising respective rotational axes of the at least one pair of propeller drives and a maximum wingspan of propellers of the at least one pair of propeller drives, and wherein the upper lift surface is arranged above a plane defined by rotational axes of the propeller drives of the at least one pair of propeller drives in order to generate a lifting force, the upper lift surface is arranged above the lower lift surface, in that the aircraft is in a form of a flying wing, and a flight attitude about a longitudinal axis or a vertical axis of the aircraft is adjusted by a difference between rotational speeds of the at least one pair of propeller drives whereby control of the propeller drives cause roll and yaw movements.

2. The aircraft according to claim 1, wherein the upper lift surface and the lower lift surface are integrated into a single closed wing in order to realize an aircraft without a fuselage.

3. The aircraft according to claim 2, wherein the closed wing is a ring wing or a box wing.

4. The aircraft according to claim 3, wherein the upper lift surface, the lower lift surface or the closed wing are rigid, of a film construction or inflatable.

5. The aircraft according to claim 1, further comprising propellers on the at least one pair of propeller drives arranged in front of or behind the upper and the lower lift surfaces in the longitudinal direction of the aircraft in order to generate an air flow over the upper lift surface or the lower lift surface.

6. The aircraft according to claim 5, wherein the at least one pair of propeller drives are arranged between the upper lift surface and the lower lift surface.

7. The aircraft according to claim 1, wherein the propellers of the at least one pair of propeller drives are at least partially shrouded by at least one propeller guard in a region of a propeller circumference.

8. The aircraft according to claim 7, wherein the weight element protrudes forward beyond the propeller guard in an intended direction of flight.

9. The aircraft according to claim 7, further comprising an antenna for receiving control signals for remotely controlling the aircraft.

10. The aircraft according to claim 1, wherein the weight element is centrally arranged on the upper lift surface, between the at least one pair of propeller drives spaced a distance from one another, wherein the weight element is connected to the upper lift surface underneath the upper lift surface such that the weight element can be pivoted about a lateral axis of the aircraft.

11. The aircraft according to claim 10, wherein the control means or an energy supply means is integrated or imprinted into the upper or the lower lift surface or into a closed wing.

12. The aircraft according to claim 1 wherein the weight element is linearly displaced in the longitudinal direction of the aircraft along the center line of the weight element or pivoted about a lateral axis of the aircraft by a servomotor or an ultrasonic motor.

13. The aircraft of claim 1, wherein the upper lift surface further comprises a V-shaped section that is tapered in the direction of the weight element and a smallest width of the V-shaped section corresponds to a width of the weight element in order to enable the weight element to protrude beyond the upper lift surface when the weight element is pivoted about a lateral axis of the aircraft.

* * * * *